March 30, 1926.

Re. 16,305

O. L. SCALBOM

CUTTER HOLDER

Original Filed Nov. 24, 1922

Inventor,
Oscar L. Scalbom,
By [illegible] Atty.

Reissued Mar. 30, 1926. Re. 16,305

UNITED STATES PATENT OFFICE.

OSCAR L. SCALBOM, OF GLENVIEW, ILLINOIS.

CUTTER HOLDER.

Original No. 1,500,643, dated July 8, 1924, Serial No. 603,085, filed November 24, 1922. Application for reissue filed August 31, 1925. Serial No. 53,718.

*To all whom it may concern:*

Be it known that I, OSCAR L. SCALBOM, a citizen of the United States, residing at Glenview, in the county of Cook and State of Illinois, have invented certain new and useful Improvements in Cutter Holders, of which the following is a specification.

This invention relates to improvements in cutter holders particularly adapted, though not necessarily limited in its use, for holding razor blades of the type commonly known as "Gillette" blades, and one of the objects of the invention is to provide an improved device of this character by means of the use of which such razor blades may be readily adapted for use as a scraper, a cutter for ripping purposes, and for various other purposes.

A further object is to provide an improved device of this character well adapted for holding a razor blade for stropping or sharpening purposes.

A still further object is to provide an improved device of this character embodying provisions whereby one of the parts of the holder may be adjusted so as to be projected beyond the cutting edge of the blade to serve as a shield or guard to protect the edge of the blade when not in use.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention, and in which—

Figure 1:
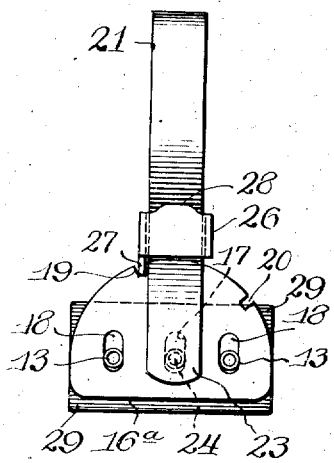
Figure 1 is an elevation from one side of the device showing the parts in one position.

Referring more particularly to the drawing the numeral 10 designates a blade holding member which may be of any desired size and configuration and constructed of any suitable material but is preferably provided with a straight edge or base 11. This member is also provided with an aperture 12 in its body and laterally projecting lugs or extensions 13, which may be formed preferably by striking up portions of the member 10.

The member is also provided with notches or recesses 14—15 in the edge thereof which are spaced from each other.

The member 16 is preferably of a similar configuration as the member 11 and is provided in its body with slots 17 and 18. Notches or recesses 19 and 20 are provided in the edge of the member 16, which are adapted to respectively register with the notches or recesses 14—15 in the member 10, when the two members are placed together so that the projections 13 on the member 10 will enter the slots 18 and the aperture 12 will register with the slot 17.

A handle designated generally by the reference numeral 21 is provided for holding the members 10 and 16. This handle may be of any desired configuration but is preferably constructed of a single piece of sheet material bent so as to form jaws 22—23 and the shape of the handle is such that the jaws 22—23 will possess a certain amount of elasticity with respect to each other.

The jaw 22 is provided with a laterally projecting lug 24 formed preferably by striking up a portion of the material.

Mounted upon the handle 21 is a sleeve or collar 26 of any desired configuration and formed in any suitable manner. Depending from the sleeve or collar is a lug 27 and projecting from the upper edge of one of the walls of the collar is an outwardly deflected portion 28 which serves as a grip or thumb engaging portion for sliding the collar 26 upon the handle 21.

In use the blade 29 (preferably of the Gillette type) is placed upon the member 10 so that the projections 13 will enter the apertures in the blade. The member 16 is then placed upon the blade so that the slots 18 will register with the apertures in the blade, the projections 13 on the member 10 being of a length to also enter the slots 18 and thereby hold the members 10 and 16 together with the blade 29 against accidental displacement with respect to each other.

The parts thus assembled are then placed between the jaws 22—23 of the handle 21, the sleeve or collar 26 being first adjusted upon the handle 21 so as to permit the jaws 22—23 to separate under their elasticity.

When the members 10 and 16 together with the blade 29 therebetween are placed between the jaws of the handle, the lug or projection 24 on the handle will enter the aperture 12 in the blade 10 and this lug or projection 24 may, if desired, be of a length to extend through the central opening in the blade so as to enter the slot 17 in the member 16.

The sleeve or collar 26 is then adjusted upon the handle 21 toward the edges of the members 10 and 16, thereby causing the jaws 22 and 23 to operate upon the members 10 and 16 causing them to clamp the blade 29.

In order to maintain the handle 21 against movement about its point of pivotal connection with the blades 10 and 16, the projection 27 is provided and this projection is adapted to enter the registering notches or recesses 14—19 in the members 10 and 16, thereby holding the parts rigidly and firmly in position.

It will be manifest that when the blade is thus secured between the members 10 and 16 and the handle is in the position shown in Figure 1, the device may be employed with efficiency as a scraper or for various other purposes and the holder may also serve as a means for holding the blade for stropping or sharpening purposes.

Figure 2:
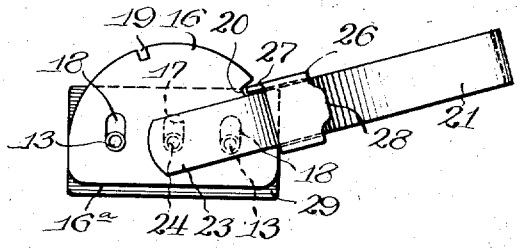
Figure 2 is a view similar to Figure 1 showing the parts in another position.

When desired the sleeve or collar 26 may be adjusted upon the handle 21 away from the members 10 and 16 so as to permit the handle to be swung about its point of pivotal connection with the members until the handle assumes the position shown in Figure 2. In this position the sleeve or collar 26 may be again adjusted towards the members 10 and 16 so that the projections 17 will enter the registering notches or recesses 15—20 to secure the handle in the position shown in Figure 2. In this position of the parts the blade is well adapted for cutting, ripping or other purposes.

Figure 3:
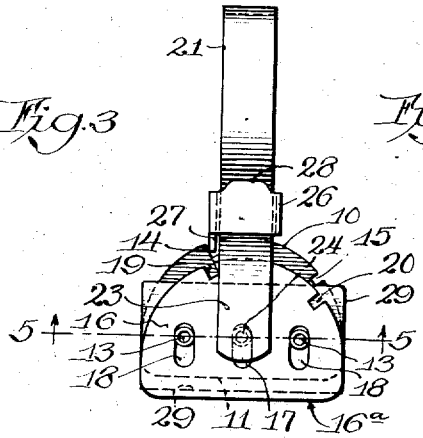
Figure 3 is a view similar to Figure 1 showing one of the members projected beyond the edge of the cutting blade.
Figure 4:
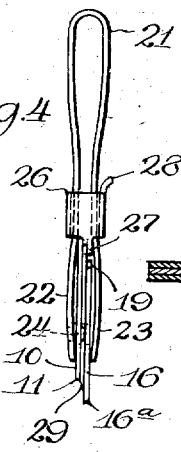
Figure 4 is a left hand end elevation of Figure 3.
Figure 5:
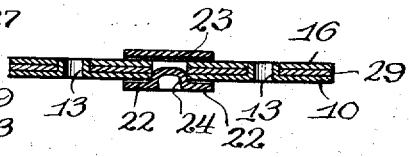
Figure 5 is a detail sectional view on line 5—5, Figure 3.
Figure 8:
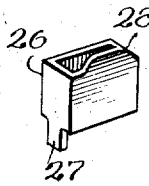
Figure 8 is a perspective view of a detail.
Figure 6:
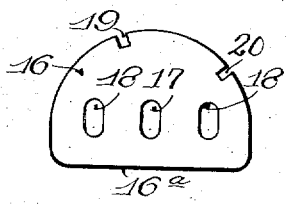
Figure 6 is a plan view of one of the blade holding members.
Figure 7:
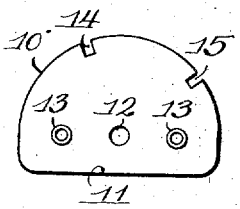
Figure 7 is a plan view of the other blade holding member.

When the device is not in use the sleeve or collar 26 may be again adjusted upon the handle 21 away from the members 10—16 so as to release the clamping effect of the jaws 22—23 upon the members, sufficiently to permit the member 16 to be shifted with respect to the member 10 to project the lower edge 16[a] of the member 16 beyond the cutting edge of the blade 29 into the position shown in Figures 3 and 4, after which and in order to secure the parts in this position, the sleeve or collar 26 may be again adjusted towards the members 10 and 16, so that the projection 27 on the sleeve or collar will enter the notch or recess 14 in the member 10, as shown in Figure 3, for securely holding the parts in this position.

It will therefore be manifest that there is provided a simple and efficient device of this character which will adapt a cutting blade for use for many purposes and when the device is not in use one of the clamping members may be adjusted to project over or beyond the cutting edge of the blade for protecting the same.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. A cutter blade holder embodying co-operating members between which the blade is held, a handle detached from the members, means co-operating with the handle for causing the said members to clamp the blade, the cutting edge of said blade projecting beyond the members, and means adapting one of the members to be projected beyond the cutting edge of the blade.

2. A cutter blade holder embodying co-operating members between which the blade is held, a handle, means co-operating with the handle for causing the said members to clamp the blade, the cutting edge of said blade projecting beyond the members, means adapting one of the members to be projected beyond the cutting edge of the blade, said handle adapted for pivotal movement with respect to said members, and means embodying the first recited means for maintaining the handle in its adjusted position with respect to the said members.

3. A cutter blade holder embodying two members for holding a blade therebetween, a forked handle into which the members extend, means pivotally connecting the handle with one of the members, means co-operating with the handle for exerting a pressure upon the ends of the handle to cause the said members to grip the blade, and interengaging means between the second recited means and the said members for maintaining the handle and the said members against relative pivotal movement.

4. A cutter blade holder embodying two members for holding a blade therebetween, a forked handle, means pivotally connecting the handle with one of the members, means co-operating with the handle for exerting a pressure upon the ends of the handle to cause the said members to grip the blade, interengaging means between the second recited means and the said members for maintaining the handle and the said members against relative pivotal movement, and means adapting one of the members to be projected beyond the cutting edge of the blade.

5. A cutter blade holder embodying two members for holding a blade therebetween, a forked handle, means pivotally connecting the handle with one of the members, means co-operating with the handle for exerting a pressure upon the ends of the handle to cause the said members to grip the blade, interengaging means between the second recited means and the said members for maintaining the handle and the said members against relative pivotal movement, and locking means embodying the first recited means for maintaining the handle in various positions to which it may be moved about its pivot.

6. A cutter blade holder embodying two co-operating and disconnected blade clamping members, one of said members being provided with a projection, the other member having a slot for receiving the projection, a handle connected with one of the members, and means connected with the handle and operable to cause the said member to clamp and hold the blade, the said projection and slot adapting one of the members to be projected beyond the cutting edge of the cutter.

7. A cutter blade holder embodying two co-operating blade clamping members, one of said members being provided with a lateral projection, the other member having a slot to receive the projection, a handle pivotally connected with the members, means connected with the handle and operable to cause the members to clamp and hold the blade, and means embodying the first recited means for maintaining the handle in various positions to which it may be moved about its pivot and with respect to the said members, the said projection and slot adapting one of the members to be projected beyond the cutting edge of the cutter.

8. A cutter blade holder embodying two co-operating and disconnected blade clamping members, co-operating means connected with the members for maintaining them in operative relation, a handle having clamping jaws between which the members are held, means connecting the handle with the members for pivotal movement with respect thereto, and means for causing the said jaws to exert pressure upon the said members to cause them to grip and hold the blade.

9. A cutter blade holder embodying two co-operating blade clamping members, co-operating means connected with the members for maintaining them in operative relation, a handle having clamping jaws between which the members are held, means connecting the handle with the members for pivotal movement with respect thereto, means for causing the said jaws to exert pressure upon the said members to cause them to grip and hold the blade, the first recited means also adapting the said members to be shifted one with relation to the other to project one of the members beyond the cutting edge of the blade.

10. A cutter blade holder embodying two co-operating blade clamping members, co-operating means connected with the members for maintaining them in operative relation, a handle having clamping jaws between which the members are held, means connecting the handle with the members for pivotal movement with respect thereto, means for causing the said jaws to exert pressure upon the said members to cause them to grip and hold the blade, there being recesses in the said members, and means connected with the last recited means and co-operating with the said notches for maintaining the handle against pivotal movement with respect to the said members.

11. A cutter blade holder embodying two co-operating blade clamping members, co-operating means connected with the members for maintaining them in operative relation, a handle having clamping jaws between which the members are held, means connecting the handle with the members for pivotal movement with respect thereto, means for causing the said jaws to exert pressure upon the said members to cause them to grip and hold the blade, there being a plurality of recesses in said members, and a projection connected with the last recited means and adapted to enter the said recesses for maintaining the handle in the various positions to which it has been moved about its pivot with respect to the said members.

12. A cutter blade holder embodying two co-operating blade clamping members, co-operating means connected with the members for maintaining them in operative relation, a handle having clamping jaws between which the members are held, means connecting the handle with the members for pivotal movement with respect thereto, means for causing the said jaws to exert pressure upon the said members to cause them to grip and hold the blade, there being recesses in the said members, and means connected with the last recited means and co-operating with the said notches for maintaining the handle against pivotal movement with respect to the said members, the first recited means adapting the said members to be shifted one with relation to the other to project one of the members beyond the cutting edge of the blade.

13. A cutter blade holder embodying two co-operating blade clamping members, a lateral projection on one of the members, the other member having a slot receiving said projection, one of the members also having an aperture in its body, the other member having a slot registering with the aperture, a handle embodying clamping jaws between which said members are disposed, a projection on one of the jaws adapted to enter said aperture and the slot registering therewith for pivotally connecting the handle and members, and a collar on the handle adapted to adjust the said jaws to cause them to exert a pressure on the members to grip the blade.

14. A cutter blade holder embodying two co-operating blade clamping members, a lateral projection on one of the members, the other member having a slot receiving said projection, one of the members also having an aperture in its body, the other member having a slot registering with the aperture, a handle embodying clamping jaws between which said members are disposed, a projection on one of the jaws adapted to enter said aperture and the slot registering therewith for pivotally connecting the handle and members, a collar on the handle adapted to adjust the said jaws to cause them to exert a pressure on the members to grip the blade, and interengaging means between the collar and one of said members for maintaining the handle against movement about its pivot.

15. A cutter blade holder embodying two co-operating blade clamping members, a lateral projection on one of the members, the other member having a slot receiving said projection, one of the members also having an aperture in its body, the other member having a slot registering with the aperture, a handle embodying clamping jaws between which said members are disposed, a projection on one of the jaws adapted to enter said aperture and the slot registering therewith for pivotally connecting the handle and members, a collar on the handle adapted to adjust the said jaws to cause them to exert a pressure on the members to grip the blade, and a projection on the collar, there being spaced recesses in one of the members adapted to receive the said projection on the said collar for securing the handle in its adjusted position and against pivotal movement with respect to the said members.

16. A cutter blade holder embodying two co-operating disconnected and separable blade clamping members and between which members the blade is held, means for maintaining the members in operative relation, and means for causing the members to exert a clamping action upon the blade, the first recited means embodying provisions adapting a portion of one of the said members to be projected beyond the cutting edge of the blade.

17. A cutter blade holder embodying two co-operating disconnected and separable blade clamping members, means for maintaining the members in operative relation, a handle, a portion of said handle being adapted to cause the said members to exert a clamping action upon the blade, the said means embodying provisions adapting a portion of one of said members to be projected beyond the cutting edge of the blade.

18. A cutter blade holder embodying two co-operating disconnected and separable blade clamping members and between which members the blade is held, a projection on one of said members, the other member having a slot for receiving the projection, and means for causing the members to exert a clamping action upon the said blade, the said projection and slot adapting a portion of one of the said members to be projected beyond the cutting edge of the blade.

19. A cutter blade holder embodying disconnected blade clamping members between which the blade is held, co-operating means on the members for guiding them in their movement one with respect to the other, and resilient means operating to cause the said members to clamp the blade, the said resilient means being yieldable to permit one of the members to be moved with respect to the other member to cover and uncover the cutting edge of the blade.

20. A cutter blade holder embodying disconnected blade clamping members between which the blade is held, a projection on one of the members, the other member having an elongated slot to receive the projection, and resilient means operating on each of the members for causing them to exert a clamping action upon the said blade, the said projection and slot adapting one of the members to be moved with respect to the other member to cover and uncover the cutting edge of the blade.

21. A cutter blade holder embodying disconnected blade clamping members between which the blade is held, a projection on one of the members, the other member having an elongated slot to receive the projection, and detached means operating upon both of the members for causing them to exert a clamping action upon the said blade, the said projection and slot adapting one of the members to be moved with respect to the other member to cover and uncover the cutting edge of the blade.

22. A cutter blade holder embodying disconnected blade clamping members between which the blade is held, a projection on one of the members, the other member having an elongated slot to receive the projection, and detached clamping means operating upon both of the members for causing them to exert a binding action upon the blade, the said projection and slot adapting one of the members to be moved to cover and uncover the cutting edge of the blade.

In testimony whereof, I have signed my name to this specification this 28th day of August, 1925.

OSCAR L. SCALBOM.